Dec. 20, 1960 V. R. WILLIAMS ET AL 2,965,198
INTERMITTENT OILER
Filed March 7, 1960

*INVENTORS*
V. R. WILLIAMS
W. P. BOBBS
BY
*Leon Arthurs*
agent

United States Patent Office 2,965,198
Patented Dec. 20, 1960

2,965,198
INTERMITTENT OILER

Victor Rudolf Williams, Toronto, Ontario, and William Peter Bobbs, Rexdale, Toronto, Ontario, Canada, assignors to Wesson Cutting Tools Limited, Toronto, Ontario, Canada, an incorporated company Filed Mar. 7, 1960, Ser. No. 13,313

19 Claims. (Cl. 184—81)

The invention relates to apparatus for intermittent delivery of small quantities of oil, for lubricating and related purposes.

Many types of machinery require lubricating at a multitude of oiling points with small quantities of oil at regular intervals. In many cases such oiling must be relatively carefully measured to avoid damage to, for example, articles being processed, by excess oil, or merely to avoid waste. Obviously it is advantageous if such oiling can be carried out automatically and lubricating devices of various kinds have been known for the purpose.

However, such devices have been relatively complicated and hence expensive, and at the same time inherently subject to wear and even failure in some cases with consequent damage to the machine or machines requiring lubrication.

It is therefore a general objective of the invention to provide lubricating apparatus which is simplified and hence economical to make and sell, and which is also less susceptible to wear or failure than prior machines.

More specifically it is an object of the invention to provide such apparatus having the foregoing advantages in which delivery of the oil results from the overflow of a quantity of oil from one oil container to another.

More specifically it is an object of the invention to provide such apparatus having the foregoing advantages in which delivery of oil results from the overflow of oil from one container to another such overflow being caused by the movement of a body into said container.

More specifically it is an object of the invention to provide such apparatus having the foregoing advantages in which the number of moving parts is reduced.

More specifically it is an object of the invention to provide such apparatus having the foregoing advantages in which frictional contact between moving parts is reduced.

The invention seeks to provide the foregoing and other advantages which will appear from the following description of an embodiment of the invention by the provision of intermittent oil delivery apparatus comprising a pair of oil containers; filling and overflow connections therebetween; a trap and conduit for the retention and delivery of some of said overflowing oil, and means operable intermittently to displace oil in one of said containers causing it to overflow into the other.

A preferred embodiment will now be described by way of example only with reference to the following drawings in which like reference devices refer to like parts of the invention throughout the several views and in which.

Figure 1:
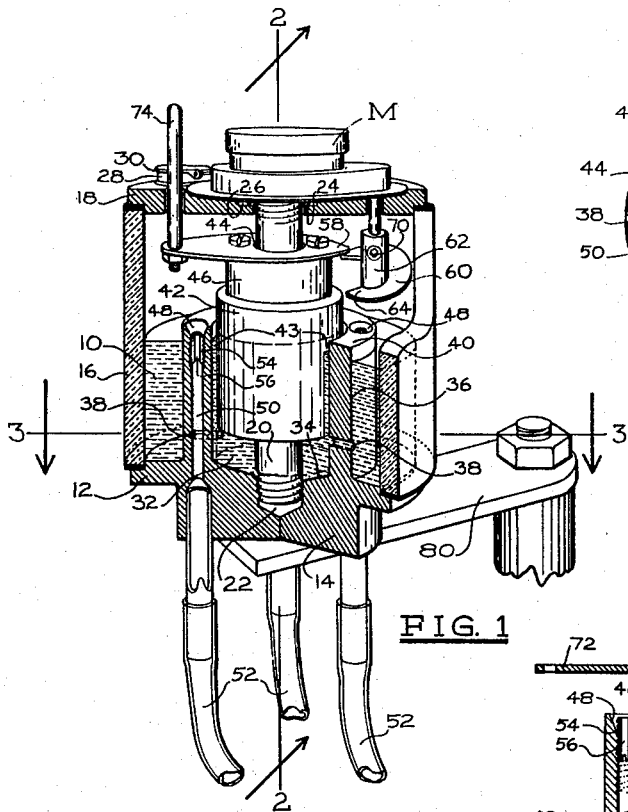
Fig. 1 is an isometric view of the instant lubricating apparatus cut away to reveal the second oil container and mechanism.
Figure 3:
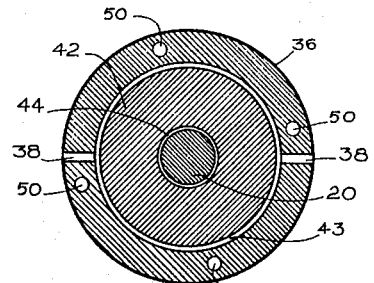
Fig. 3 is a plan view of the second oil container and mechanism sectioned along the line 3—3 of Fig. 1.
Figure 2:
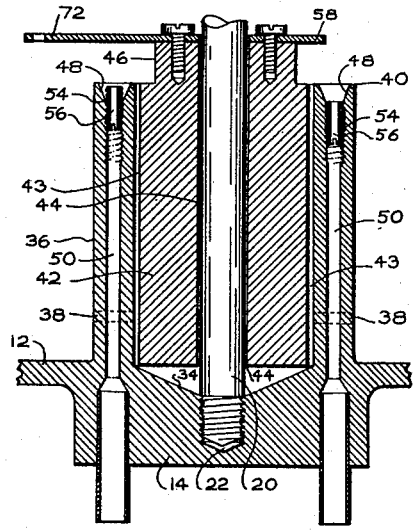
Fig. 2 is an elevational view of the second oil container and mechanism sectioned along the line 2—2 of Fig. 1.

This preferred embodiment of the invention which is here illustrated for the purposes of example only will be seen from Fig. 1 to be comprised of an oil container or reservoir 10 consisting of flange 12 formed on base 14, and supporting sidewall 16 thereon. Top plate 18 fits over side wall 16 closing container 10 and is held in position by bolt 20, one end of which is screwed into base 14 at recess 22, and the other end of which passes through top plate 18 which is engaged by nut 24 fitting into well 26 provided in top plate 18 for the purpose. Top plate 18 is also provided with a filling orifice 28 normally closed by cap 30. In this particular embodiment sidewall 16 may advantageously be made of transparent material providing a simple means of observing the oil level in container 10.

A second oil container 32 is located in this embodiment, within container 10 and consists of bottom 34 (provided by base 14) and sidewall 36 formed integrally therewith, separating it from outer container 10. It will be seen that sidewall 36 in this preferred embodiment is in fact common to both outer container 10 and inner container 32 and this construction, while being by no means exhaustive of all possible constructions, offers particular advantages for the practice of the invention, as will appear below.

For the purpose of filling container 32 with oil from container 10, filling connections 38 extend through sidewall 36 connecting both said containers towards the bottom thereof, permitting a relatively restricted flow of oil therebetween.

Sidewall 36 is of reduced height in relation to the remainder of container 10 and top edge 40 thereof defines the top of container 32 which is open for the purpose of providing an overflow connection between the said containers permitting any overflow of oil to spill over or flow relatively freely from one to the other.

For the purpose of displacing oil contained within inner container 32 and thus producing such an overflow body 42 is provided for movement into and out of the said container. In this preferred example, body 42 is of roughly the same height as container 32 but is of reduced diameter in relation thereto, enabling it to fit relatively loosely therein. The volume of body 42 will depend upon the particular shape and dimensions thereof but preferably should be substantial in relation to the volume of container 32 though of course whether it is in fact greater or less than the volume of container 32 will depend upon the particular design of the apparatus as a whole.

In any event body 42 should be so shaped as to provide a passageway 43 between itself and container 32 so as to permit a surge of displaced oil upwardly within container 32 on movement of body 42 into container 32. In this prefered embodiment, such passageway 43 is provided by the relatively substantial clearance between the sidewall 36 of container 32 and body 42 itself, such clearance having the further and highly utilitarian advantage that there is an absence of contact between body 42 and container 32 and therefore no friction is set up between these two members on movement of body 42 as aforesaid. In the result the possibility of wear arising between these two members is minimised, and the possibility of the operation of the apparatus being disrupted by body 42 becoming jammed in position by some impurity or extraneous matter lodging itself between body 42 and sidewall 36 of container 32 is reduced. Furthermore the clearance space provided between the sidewall 36 of container 32 and body 42 affords little or no resistance to the passage of oil therethrough and is not susceptible to blockage by extraneous matter for the reasons set out above with a consequent gain in the reliability of the apparatus as a whole in operation.

It will also be seen that in order to guide movement of body 42 bolt 20 passes through passageway 44 formed in body 42 for the purpose. Again in order to minimise wear and friction and also to minimise the chances of some stoppage occurring, passageway 44 is made somewhat larger than bolt 20 to provide a certain degree of clearance between body 42 and bolt 20. Bolt 20 serves to guide the body 42 into and out of container 32 as stated and it is obvious that in fact some friction will occur as a result of this function though not to any significant degree.

In order to restrict the escape of any overflow of oil occurring by passage of oil around bolt 20 upwardly through passageway 44 body 42 is provided with an extension or collar 46 continuing for some distance above the top edge 40 of sidewall 36.

The overflow of oil displaced by the movement of body 42 into container 32 is thus more or less confined to the space or clearance provided between body 42 and sidewall 36 of container 32 from whence it will flow over the overflow connection provided by top edge 40 of sidewall 36 and spill over into container 10. In order to retain a small quantity of such overspill a plurality of traps 48 are provided around top edge 40 of sidewall 36, such traps 48 being in turn connected to the various oiling points of means of conduits 50 running axially or lengthwise of sidewall 36 and the flexible delivery tubes 52. In this preferred embodiment the quantity of oil retained by any one of traps 48 may be regulated by means of its respective grub screw 54 located at the top of conduit 50 and having a passageway 56 formed therein for passage of oil therethrough. Grub screws 54 may be rotated by removing the appropriate tube 52 and inserting a screw driver (not shown) upwardly through conduit 50. It will be seen that a clockwise rotation of a grub screw 54 will advance it into its respective trap 48 consequently reducing trap 48 in size and thereby reducing the quantity of oil retained thereby and subsequently delivered to its respective oiling point; conversely rotation anticlockwise will effect an increase in the quantity of oil delivered.

Movement of body 42 out of container 32 is effected by means of an escapement type linkage comprising an abutment or tongue 58 fastened to collar 46 of body 42 and extending into engagement with the worm type circular cam 60. Cam 60 is mounted on cylinder 62 and it will be seen from Fig. 4 that cam 60 more or less encircles cylinder 62, from low point 64 to high point 66 thereof. Cylinder 62 is in turn fastened to shaft 68 by grub screw 70, shaft 68 being driven by any suitable means, for example a low speed electrical timer motor shown generally at M and mounted in any suitable manner on top plate 18.

Body 42 may also be moved out of container 32 manually, bracket 72 extending from collar 46 of body 42 and carrying hand piece 74 attached thereto which extends through slotted hole 76 in top plate 18. Spring 78 attached to top plate 18 is biassed to maintain hand piece 74 at one end of slotted hole 76, for purposes to be described, but is adjusted so that under normal operation of the apparatus hand piece 74 may move vertically within slotted hole 76 relatively freely without spring 78 binding the same.

The whole apparatus may be mounted on any suitable bracket 80 adapted for example, for attachment to any suitable part of the machine.

In operation outer container 10 is partially filled with oil through filling orifice 28, the precise level of such oil depending upon the various dimensions of the apparatus but in any event it should not be above the top of sidewall 36 and preferably, as in this preferred embodiment, should be somewhat below that point. Oil will then flow through filling connections 38 into container 32 and will find its own level therein flowing upwardly around body 42 both between body 42 and sidewall 36 and also between body 42 and bolt 20. Motor M may then be switched on thereby rotating shaft 68, cylinder 62 and cam 60 at the desired speed in a clockwise direction (view from above). As cam 60 rotates low point 64 thereof will pass beneath tongue 58 and shortly thereafter tongue 58 will be contacted by cam 60 and will commence to rise as cam 60 continues to rotate. Movement of tongue 58 upwardly under the influence of cam 60 will in turn cause collar 46 and body 42 attached thereto to move upwardly out of container 32 and thus gradually increase the volume of container 32 available for filling with oil. Oil in container 10 will seek to equalize its level with that of the oil in container 32 and thus some oil will flow through filling connections 38 causing a continuous, slight drop in the level of oil in the whole system, though it is to be emphasized that the whole process in the majority of applications, will be so gradual as to be virtually imperceptible. As tongue 58 approaches the high point 66 of cam 60 the quantity of oil in container 32 will be at a maximum. Continued rotation of cam 60 past this point will cause disengagement thereof from tongue 58, with the result that body 42 and collar 46 are free to fall under the influence of gravity into container 32. Movement of body 42 into container 32 will displace the oil contained therein and will cause it to surge upwardly around body 42 both in passageway 43 between sidewall 36 and body 42 and also in passageway 44 between body 42 and bolt 20 thus causing a momentary wave of oil to flow over sidewall 36 into container 10. Since top edge 40 of sidewall 36 is lower than collar 46 it will be seen that the principal path followed by the oil displaced from container 32 will be between sidewall 36 and body 42 and thereafter to spill over top edge 40 into container 10 once more. Obviously a certain quantity may surge upwardly within body 42 around bolt 20 but this quantity will be very small in the majority of cases for the reasons stated. In some cases, a certain quantity of oil may flow back from container 32 into container 10 through filling connections 38, however, such a quantity of oil can be minimized by suitable adjustments of the relative sizes of body 42 and container 32 and also by ensuring that a reasonably substantial part of the volume of container 32 is vacated by movement of body 42 upwardly thereby permitting a substantial quantity of oil to collect in container 32 in the manner aforesaid. Such reverse flow through filling connections 38 can also be minimized by suitable adjustment of the relative sizes of the space between sidewall 36 and body 42 and the size and number of filling connections 38. Furthermore it will be observed that, at least to a certain extent, filling connections 38 are partially occluded by body 42, at least during part of its movement into container 32, and it is thought that such occlusion may assist in minimizing the reverse flow of oil back into container 10.

In any event, it is unnecessary that all of the oil in container 32 should be displaced therefrom, in whatever direction, and it is sufficient that at least some of the oil contained therein overflows therefrom and spills over top edge 40 of sidewall 36 into the container 10.

As such oil spills over into container 10 a small portion thereof will be retained by traps 48 located in top edge 40 of sidewall 36 and will thereafter flow through passageways 56 in grub screws 54 into conduits 50 and thence to tubes 52 carrying such oil to the various lubricating points.

Obviously the timing of the various operations can be varied to suit the requirements of any particular machine merely by speeding up or slowing down the operation of timer motor M. Furthermore, as has already been stated, the quantity of oil delivered on any one operation of the machine to any one oiling point can be regulated by movement of grub screw 54 into or out of the respective trap 48 without affecting the quantity of oil delivered to the other oiling points.

Figure 4:
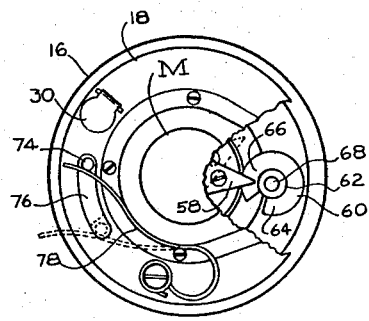
Fig. 4 is a plan view of the complete apparatus shown in Fig. 1 with part thereof cut away to reveal the interior mechanism.

In some circumstances it may be desirable to override the timing of motor M and accordingly an operative can merely grasp hand piece 74 and move it against spring 78 from its position shown in Fig. 4 to the opposite end of slotted hole 76 (as shown in ghost form), such movement obviously causing a corresponding rotary movement of collar 46 and body 42 around bolt 20. Such movement will also swing tongue 58 away from cam 60 after which the operative can then simply draw hand piece 74 vertically upwards, causing body 42 to move out of container 32. After a pause for a period sufficient for the oil in container 10 to flow into container 32 as aforesaid and find its own level, hand piece 74 can then be pushed downwardly thus moving body 42 into container 32, displacing the oil therein as aforesaid. These movements can be repeated as many times as desired. It should be observed however that hand piece 74 must be maintained in the position shown in ghost form throughout such manual operation to keep tongue 58 out of engagement with cam 60.

The foregoing is a preferred embodiment of the invention and is here described by way of example only. We do not limit ourselves to the specific construction illustrated other than as specified in the appended claims which are intended to include all modifications which do not depart from the spirit of our invention.

What we claim as our invention is:

1. Intermittent oil delivery apparatus comprising a pair of oil containers; a filling connection between them enabling one of said containers to be filled with oil from the other; an overflow connection between them permitting oil from one of them to overflow into the other; at least one trap arranged to intercept and entrap at least some of the oil overflowing as aforesaid; at least one conduit for conveying said entrapped oil to an oiling point, and intermittently operable means for displacing oil contained in one of said containers to rise therein and to overflow into the other of them as aforesaid.

2. The apparatus set forth in claim 1 wherein said filling connection is connected toward the bottom of at least one said container.

3. The apparatus set forth in claim 1 wherein said filling connection permits only a relatively restricted flow of oil therethrough.

4. The apparatus set forth in claim 1 wherein said overflow connection is located towards the top of at least one said container.

5. The apparatus set forth in claim 1 wherein said overflow connection permits a relatively free flow of oil between said containers.

6. The apparatus set forth in claim 1 including a common wall separating said containers, said wall being of reduced height in relation to the remainder of at least one of said containers for providing the overflow connection therebetween as aforesaid.

7. The apparatus set forth in claim 1 wherein one said container is located within the other said container the one said container having an open top constituting said overflow connection to the other said container.

8. The apparatus set forth in claim 1 including a common wall separating said containers and providing the overflow connection therebetween, and a recess in the top of said wall forming said trap for said oil.

9. The apparatus set forth in claim 1 wherein said trap is arranged to entrap only a measured quantity of oil as aforesaid.

10. The apparatus set forth in claim 1 wherein said trap includes means for varying the quantity of oil entrapped thereby.

11. The apparatus set forth in claim 1 including a common wall separating said containers and providing the overflow connection therebetween, and a drilling running axially of said wall forming part of said conduit.

12. The apparatus set forth in claim 1 including a body for displacing said oil within said container said body being of substantial volume in relation to said container and dimensioned to fit relatively loosely therewithin, and mechanism for moving the same out of said container permitting the same to fill with oil and thereafter for returning said body into said container for displacing the oil therein as aforesaid.

13. The apparatus set forth in claim 1 including a body for displacing said oil within said container, said body being of substantial volume in relation to said container and dimensioned to fit relatively loosely therewithin, providing a passageway for said displaced oil between itself and said container.

14. The apparatus set forth in claim 1 wherein operation of said displacing means displaces said oil through both filling and overflow connections, the flow through said overflow connection being greater than the flow through said filling connection.

15. The apparatus set forth in claim 1 wherein said filling connection is at least partially occluded during at least part of the operation of said displacing means.

16. The apparatus set forth in claim 1 including a cylindrical body for displacing said oil and wherein said one container at least, is cylindrical, said body being of approximately the same height but of reduced diameter in relation to said container permitting said body to fit relatively loosely therewithin and providing a passageway for said displaced oil between itself and said container.

17. The apparatus set forth in claim 1 including a motor, and linkage inter-connecting the same to said displacing means for procuring operation thereof at regularly spaced intervals.

18. The apparatus set forth in claim 1 including a body for displacing said oil movable into and out of said container, a motor, and linkage inter-connecting the same with said body for operation thereof at regularly spaced intervals; said linkage including an abutment attached to said body and an escapement moved by said motor, said abutment being engaged by said escapement to move said body slowly out of said container and thereafter abruptly releasing it and permitting said body to return independently thereof.

19. The apparatus set forth in claim 1 wherein said displacing means is manually operable.

References Cited in the file of this patent
UNITED STATES PATENTS

| | | |
|---|---|---|
| 595,826 | Walch | Dec. 21, 1897 |
| 1,585,186 | Crispen | May 18, 1926 |
| 2,464,714 | Petersen | Mar. 15, 1949 |